(12) United States Patent
Stein et al.

(10) Patent No.: US 10,021,459 B2
(45) Date of Patent: Jul. 10, 2018

(54) COMPUTERIZED SYSTEM AND METHOD FOR DETERMINING MEDIA BASED ON SELECTED MOTION VIDEO INPUTS

(71) Applicant: OATH INC., New York, NY (US)

(72) Inventors: Robert Stein, New York, NY (US); Tony Ke, New York, NY (US); Rasmus Zwickson, Brooklyn, NY (US)

(73) Assignee: OATH INC., New York, NY (US)

( * ) Notice: Subject to any disclaimer, the term of this patent is extended or adjusted under 35 U.S.C. 154(b) by 314 days.

(21) Appl. No.: 14/877,201

(22) Filed: Oct. 7, 2015

(65) Prior Publication Data
US 2017/0105048 A1    Apr. 13, 2017

(51) Int. Cl.
| | |
|---|---|
| G06F 3/00 | (2006.01) |
| H04N 21/482 | (2011.01) |
| G06F 3/0482 | (2013.01) |
| G06F 17/30 | (2006.01) |
| H04N 21/475 | (2011.01) |
| H04N 21/466 | (2011.01) |
| G06F 3/0485 | (2013.01) |

(52) U.S. Cl.
CPC ....... *H04N 21/4826* (2013.01); *G06F 3/0482* (2013.01); *G06F 3/0485* (2013.01); *G06F 17/30032* (2013.01); *G06F 17/30038* (2013.01); *H04N 21/4668* (2013.01); *H04N 21/4755* (2013.01); *H04N 21/4828* (2013.01)

(58) Field of Classification Search
CPC .................................................. G06F 3/0482
USPC ........................................................ 715/719
See application file for complete search history.

(56) References Cited

U.S. PATENT DOCUMENTS

| | | | |
|---|---|---|---|
| 8,139,900 B2 * | 3/2012 | Gokturk ............ | G06F 17/30253 382/278 |
| 9,612,689 B2 * | 4/2017 | Harrison ................ | G06F 3/043 |
| 2011/0126148 A1 * | 5/2011 | Krishnaraj .............. | G06F 3/016 715/784 |
| 2014/0282237 A1 * | 9/2014 | Fuzell-Casey ..... | G06Q 30/0601 715/810 |
| 2016/0062569 A1 * | 3/2016 | Jenkins ................. | G06F 3/0482 715/716 |
| 2016/0092559 A1 * | 3/2016 | Lind ................... | H04L 65/4084 715/716 |
| 2016/0110041 A1 * | 4/2016 | Fuzell-Casey ........ | G06F 3/0482 715/719 |
| 2017/0092323 A1 * | 3/2017 | Goldman ............... | G11B 27/10 |

* cited by examiner

*Primary Examiner* — William Titcomb
(74) *Attorney, Agent, or Firm* — James J. DeCarlo; Greenberg Traurig, LLP

(57) ABSTRACT

Disclosed are systems and methods for improving interactions with and between computers in content searching, generating, hosting and/or providing systems supported by or configured with personal computing devices, servers and/or platforms. The systems interact to identify and retrieve data within or across platforms, which can be used to improve the quality of data used in processing interactions between or among processors in such systems. The disclosed systems and methods provide systems and methods for automatically determining and suggesting media for a user based on a determined state of the user. The state determination of a user is based on user input respective to media representing specific categories of moods.

19 Claims, 8 Drawing Sheets

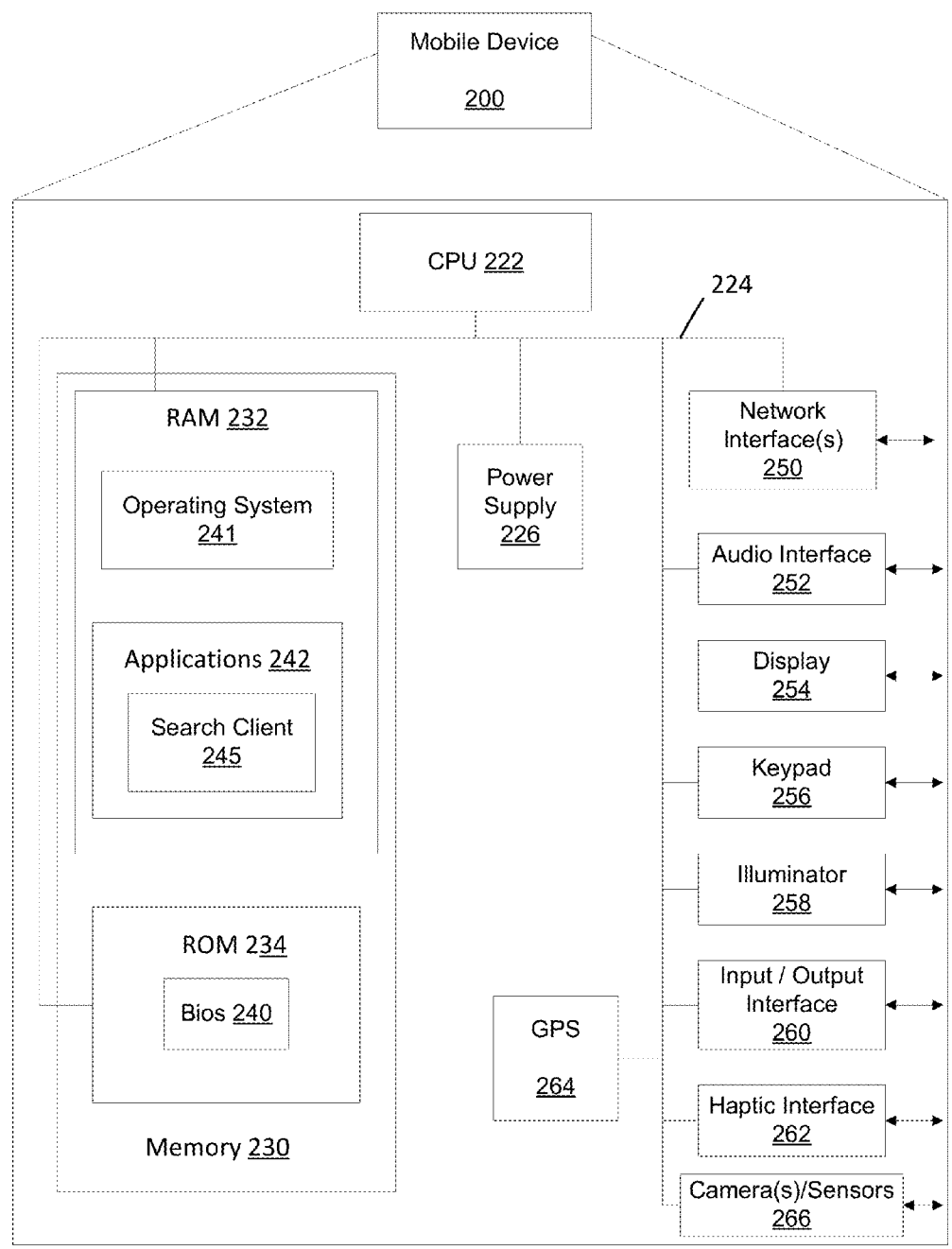

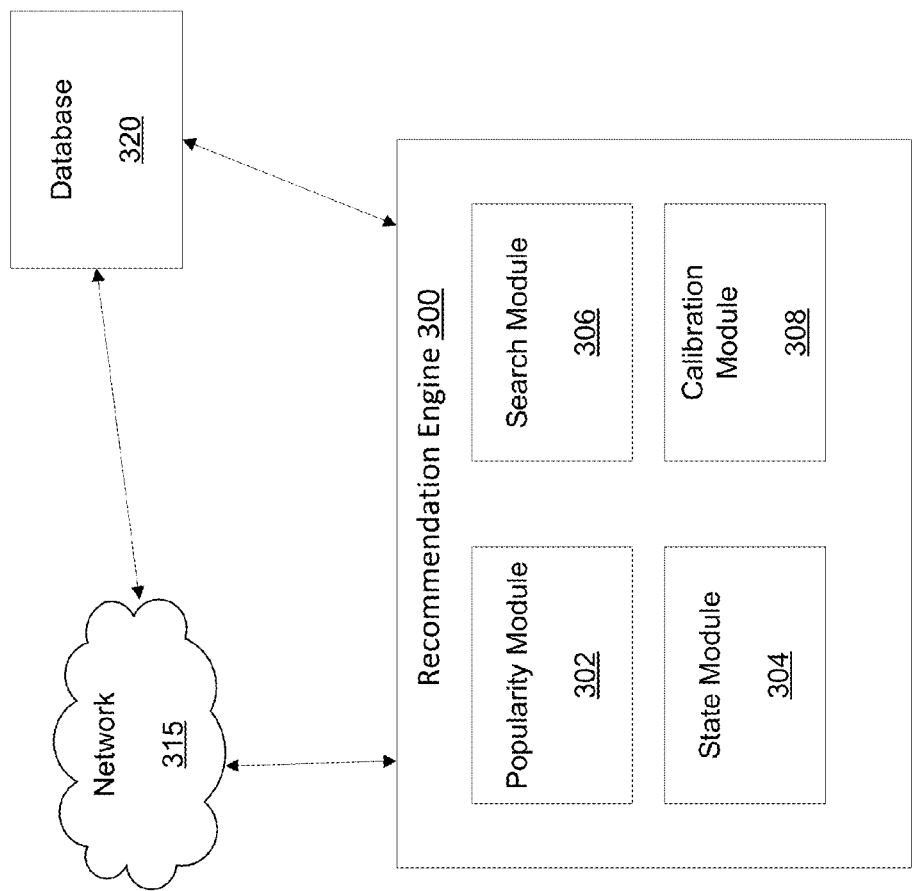

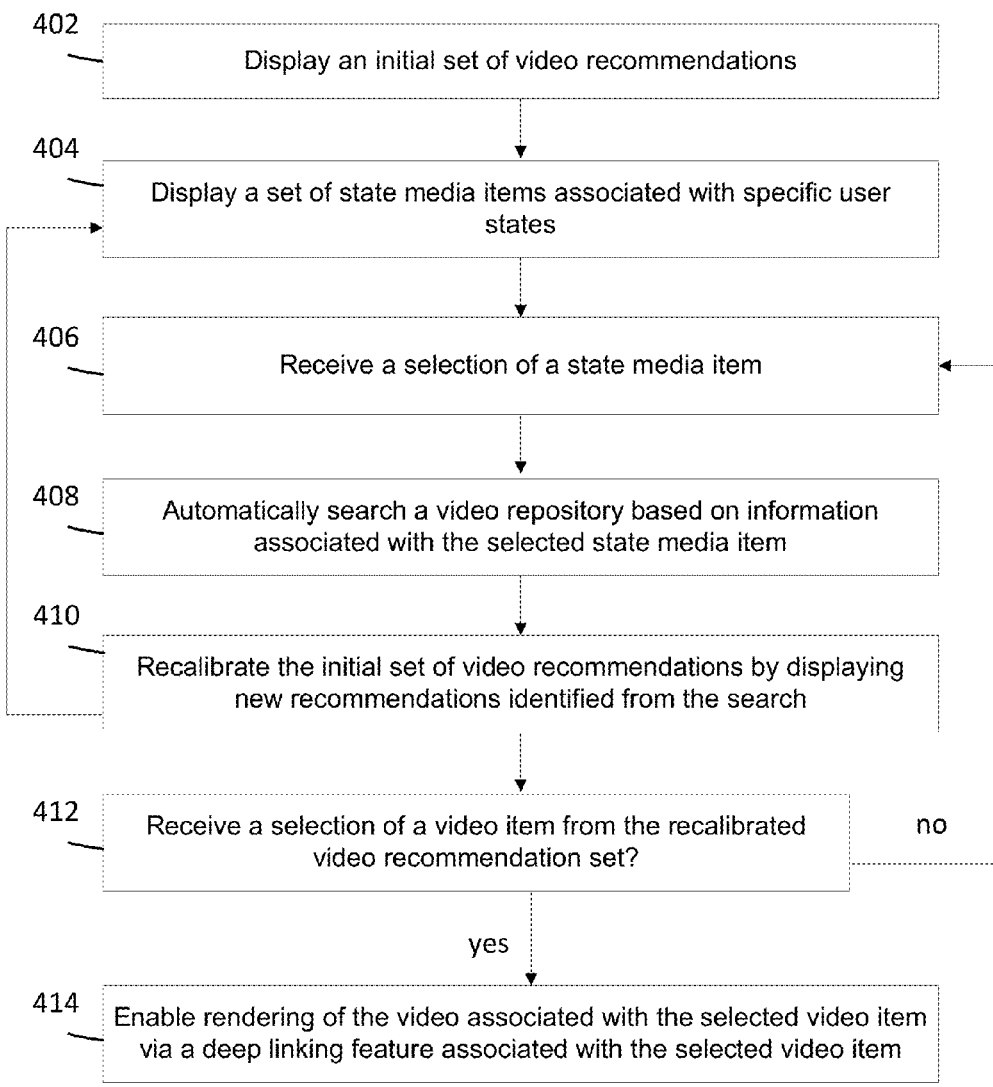

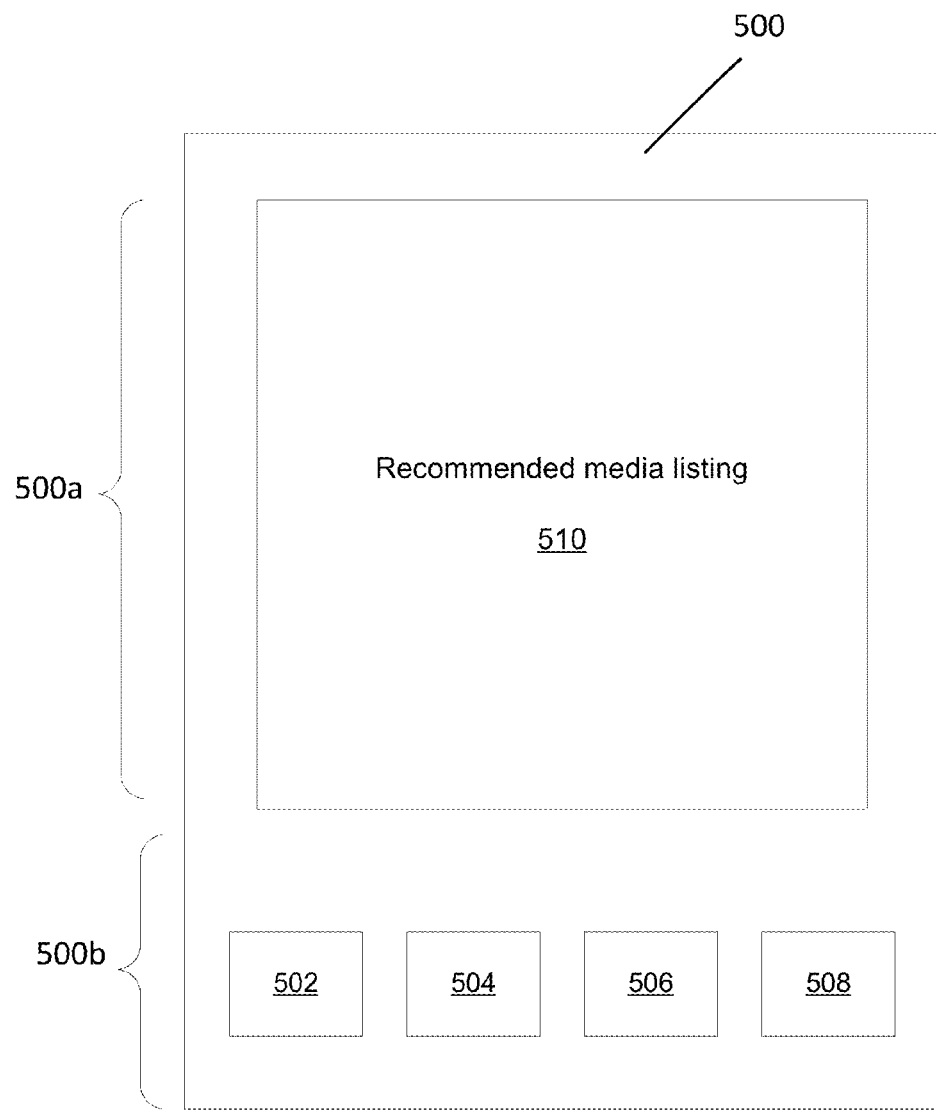

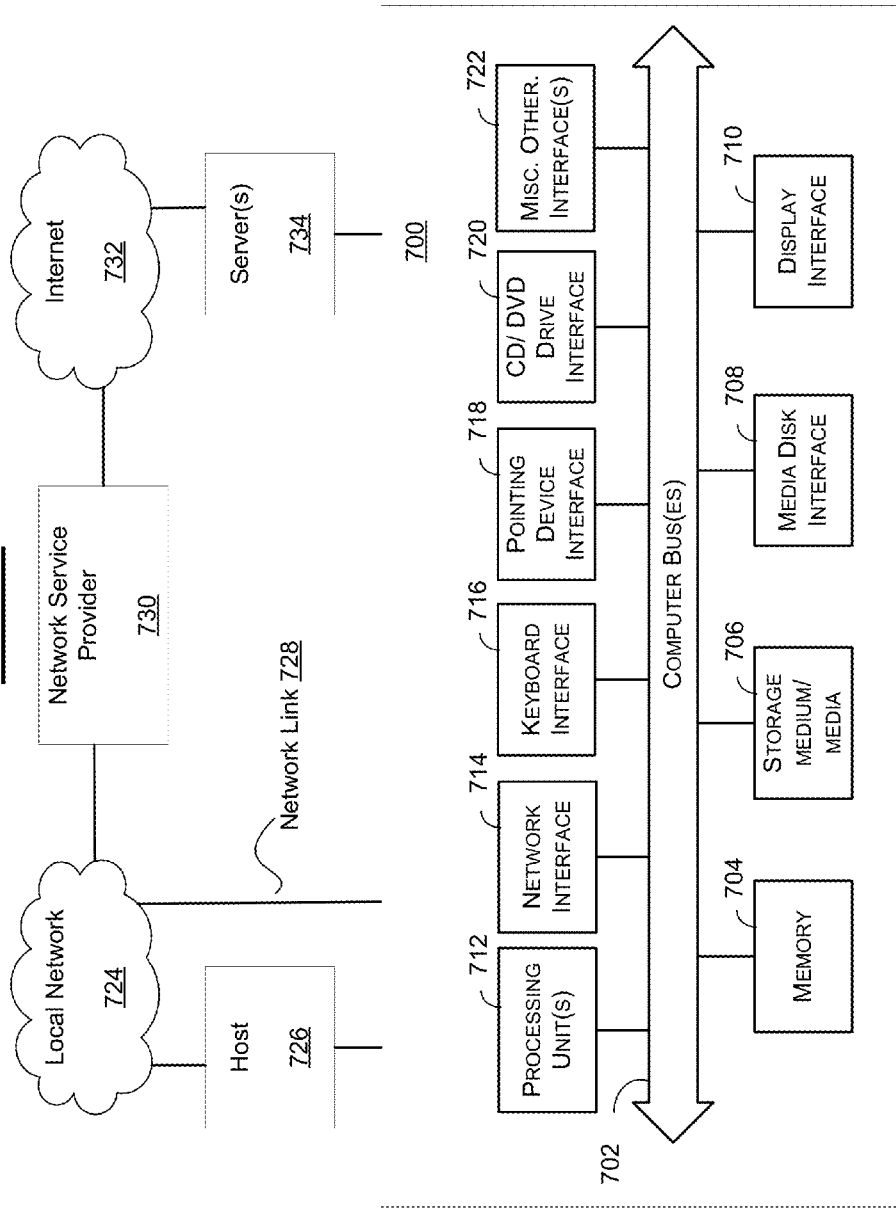

COMPUTERIZED SYSTEM AND METHOD FOR DETERMINING MEDIA BASED ON SELECTED MOTION VIDEO INPUTS

This application includes material that is subject to copyright protection. The copyright owner has no objection to the facsimile reproduction by anyone of the patent disclosure, as it appears in the Patent and Trademark Office files or records, but otherwise reserves all copyright rights whatsoever.

FIELD

The present disclosure relates generally to improving the performance of content searching, generating, providing and/or hosting computer systems and/or platforms by modifying the capabilities and providing non-native functionality to such systems and/or platforms for automatically determining and communicating media to a user based on a state determination of the user.

SUMMARY

The present disclosure provides systems and methods for improved media distribution to users based on a state determination of a user via interaction with a specific user interface having a distinct look and feel, running as an application on a user device. According to some embodiments, the state determination of a user, which involves the determination of the user's current feelings or emotions, is based on analysis of a user's interactions with displayed state media items which may be static or animated icons, each icon representing different possible user state. In embodiments the animated icon can be a short movie trailer excerpt. For example, state categories can include, but are not limited to, media associated with emotions or moods. For example a person can select a movie that is associated with feelings or emotions or moods such as happy, sad, adventurous, romantic, nostalgic, horrific and the like. Upon the user being presented with the icons, the user has the ability to select a specific state through selection of a particular icon. Based on such selection, a search is performed at one or more media sources for media that relates to or is associated with the selected icon and a media listing of possible media items associated with the state represented by the selected icon is provided to the user. The media listing comprises media information corresponding to media that relates to the selected state—that is, media that has content related to the selected emotion. The icons can then be presented again for further or alternate state refinement if a media item is not selected for consumption. Once selected the media item can be presented on the device in an application native to the source of the selected media item via deep linking from the instant user interface.

It will be recognized from the disclosure herein that embodiments of the instant disclosure provide improvements to a number of technology areas, for example those related to systems and processes that handle or process video recommendations, such as but not limited to, search engines, local and/or web-based applications, e-mail or other types of media rendering or recommendation platforms, electronic social networking platforms and the like. The disclosed systems and methods can effectuate increased speed and efficiency in ways users can access new media content, in addition to an increased contextual relevancy per user regarding the media provided to a user, thereby reducing user effort, as the disclosed systems and methods, inter alia, reduce the amount of required input for a user upon searching for media to view. Users will be provided a more fluid and personalized experience through the disclosed systems and methods leveraging of information about a user's emotional state which will enable the user to avoid having to provide all, if any, aspects of desired/requested information.

In accordance with one or more embodiments, a method is disclosed which includes displaying, on a display of a computing device within a first portion of a displayed user interface (UI), a first set of state media items, each state media item visibly displaying content associated with a human mood; receiving, at the computing device from a user, a selection of a state media item from the first state media item set; determining, via the computing device, a feature vector for the selected state media item, the feature vector comprising an n-dimensional vector representing the mood content; communicating, via the computing device, a search request for media to a media repository based on the determined feature vector, wherein the feature vector is comprised in a search term for identifying media associated with the user within the media repository; receiving, at the computing device, a search result comprising media information associated with user; compiling, via the computing device, a media item presentation based on the search result; and displaying, by the computing device, the media item presentation in a second portion of the UI.

In accordance with one or more embodiments, a non-transitory computer-readable storage medium is provided, the non-transitory computer-readable storage medium tangibly storing thereon, or having tangibly encoded thereon, computer readable instructions that when executed cause at least one processor to perform a method for automatically determining and recommending media for a user based on a state determination of the user.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code (or program logic) executed by a processor(s) of a computing device to implement functionality in accordance with one or more such embodiments is embodied in, by and/or on a non-transitory computer-readable medium.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure:

FIG. 2 depicts is a schematic diagram illustrating an example of client device in accordance with some embodiments of the present disclosure;

FIG. 3 is a schematic block diagram illustrating components of an exemplary system in accordance with embodiments of the present disclosure;

FIG. 4 is a flowchart illustrating steps performed in accordance with some embodiments of the present disclosure;

FIGS. 5A-5B illustrate non-limiting examples of user interfaces in accordance with some embodiments of the present disclosure;

FIG. 7 is a block diagram illustrating the architecture of an exemplary hardware device in accordance with one or more embodiments of the present disclosure.

DESCRIPTION OF EMBODIMENTS

Figure 1:
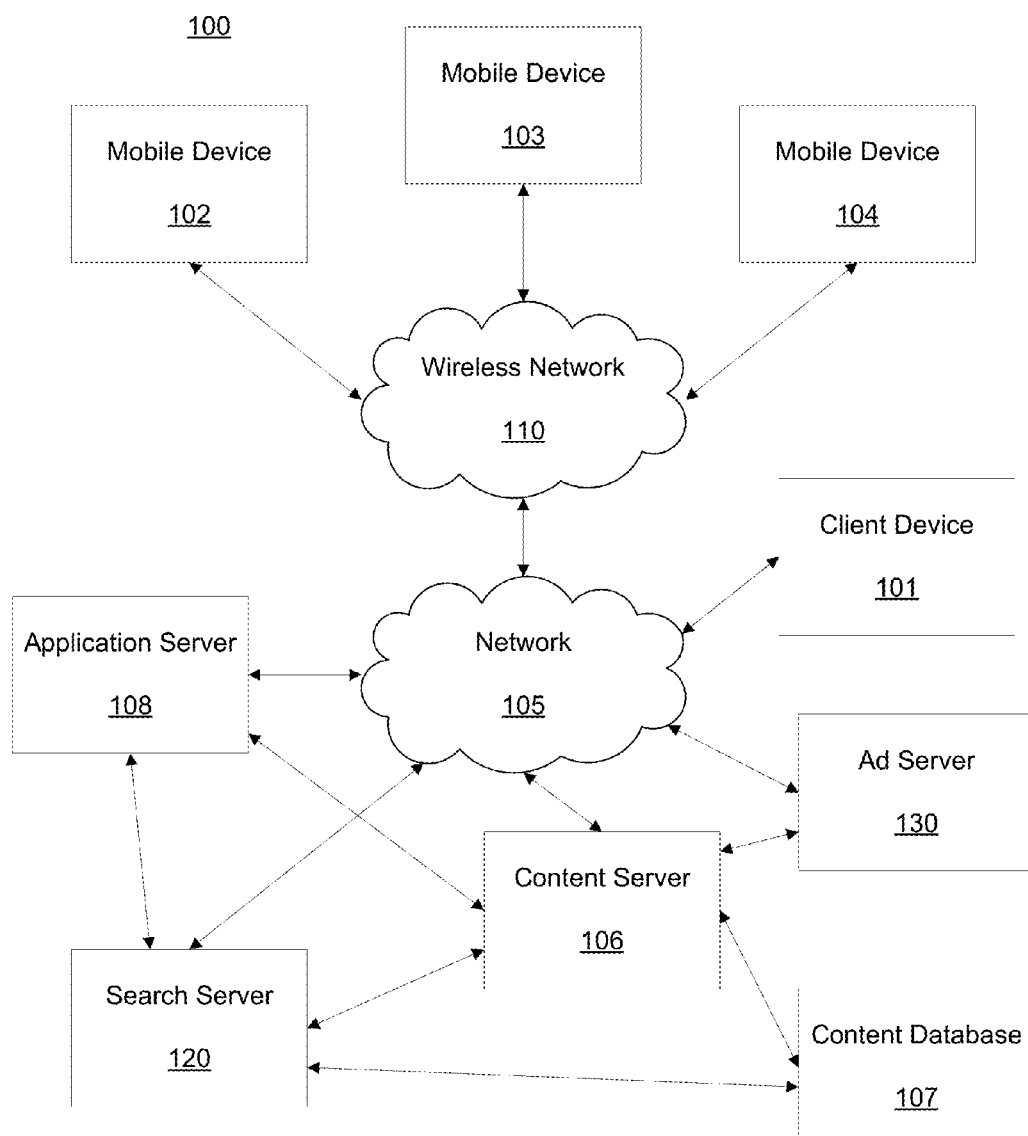
FIG. 1 is a schematic diagram illustrating an example of a network within which the systems and methods disclosed herein could be implemented according to some embodiments of the present disclosure.

The present disclosure will now be described more fully hereinafter with reference to the accompanying drawings, which form a part hereof, and which show, by way of illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

These computer program instructions can be provided to a processor of: a general purpose computer to alter its function to a special purpose; a special purpose computer; ASIC; or other programmable digital data processing apparatus, such that the instructions, which execute via the processor of the computer or other programmable data processing apparatus, implement the functions/acts specified in the block diagrams or operational block or blocks, thereby transforming their functionality in accordance with embodiments herein.

For the purposes of this disclosure a computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a wired or wireless line or link, for example.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly.

A wireless network may further employ a plurality of network access technologies, including Wi-Fi, Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For purposes of this disclosure, a client (or consumer or user) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device an Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A client device may vary in terms of capabilities or features. Claimed subject matter is intended to cover a wide range of potential variations. For example, a simple smart phone, phablet or tablet may include a numeric keypad or a display of limited functionality, such as a monochrome liquid crystal display (LCD) for displaying text. In contrast, however, as another example, a web-enabled client device may include a high-resolution screen, one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

A client device may include or may execute a variety of operating systems, including a personal computer operating system, such as a Windows, iOS or Linux, or a mobile operating system, such as iOS, Android, or Windows Mobile, or the like.

A client device may include or may execute a variety of possible applications, such as a client software application enabling communication with other devices, such as communicating one or more messages, such as via email, for example Yahoo!® Mail, short message service (SMS), or multimedia message service (MMS), for example Yahoo! Messenger®, including via a network, such as a social network, including, for example, Tumblr®, Facebook®, LinkedIn®, Twitter®, Flickr®, or Google+®, Instagram™, to provide only a few possible examples. A client device may also include or execute an application to communicate content, such as, for example, textual content, multimedia content, or the like. A client device may also include or execute an application to perform a variety of possible tasks, such as browsing, searching, playing or displaying various forms of content, including locally stored or streamed video, or games (such as fantasy sports leagues). The foregoing is provided to illustrate that claimed subject matter is intended to include a wide range of possible features or capabilities.

The principles described herein may be embodied in many different forms. By way of background, conventional media recommendation systems attempt the solve the "What to watch?" problem for users by having a user label what he/she desires to watch based on a text or browse listing of genres. Such techniques provide a limited static and archaic methodology that only enables the user's the ability to select media according to predefined listings set by media providers and/or those parties that created the media (e.g., movie studios).

The disclosed systems and methods remedy shortcomings in the art and provide an improved media recommendation system and/or platform that enables users' the ability to receive media recommendations based on a determination as to the user's current feelings or emotions. The instant disclosure provides systems and methods for automatic determination of media to be recommended to a user based on a state determination of a user. According to some embodiments, the state determination of a user, which involves the determination of the user's current feelings or emotions, is based on analysis of a user's selection of one or more displayed media items that represent categories of a user's state. For example, state categories can include, but are not limited to, happiness, sadness, adventure, and the like. Thus, upon the user being presented with displayed media representing a specific set of states, the user has the ability to select a specific state through user input that identifies a particularly displayed media item. Based on such selection, a search is performed for media that relates to the selected media item and a media listing is provided to the user. The media listing comprises media information corresponding to media that relates to the selected state. In other words, for example, all of the recommended media relates to the selected state the user identified in his/her selection from the set of displayed media items.

Figure 5B:
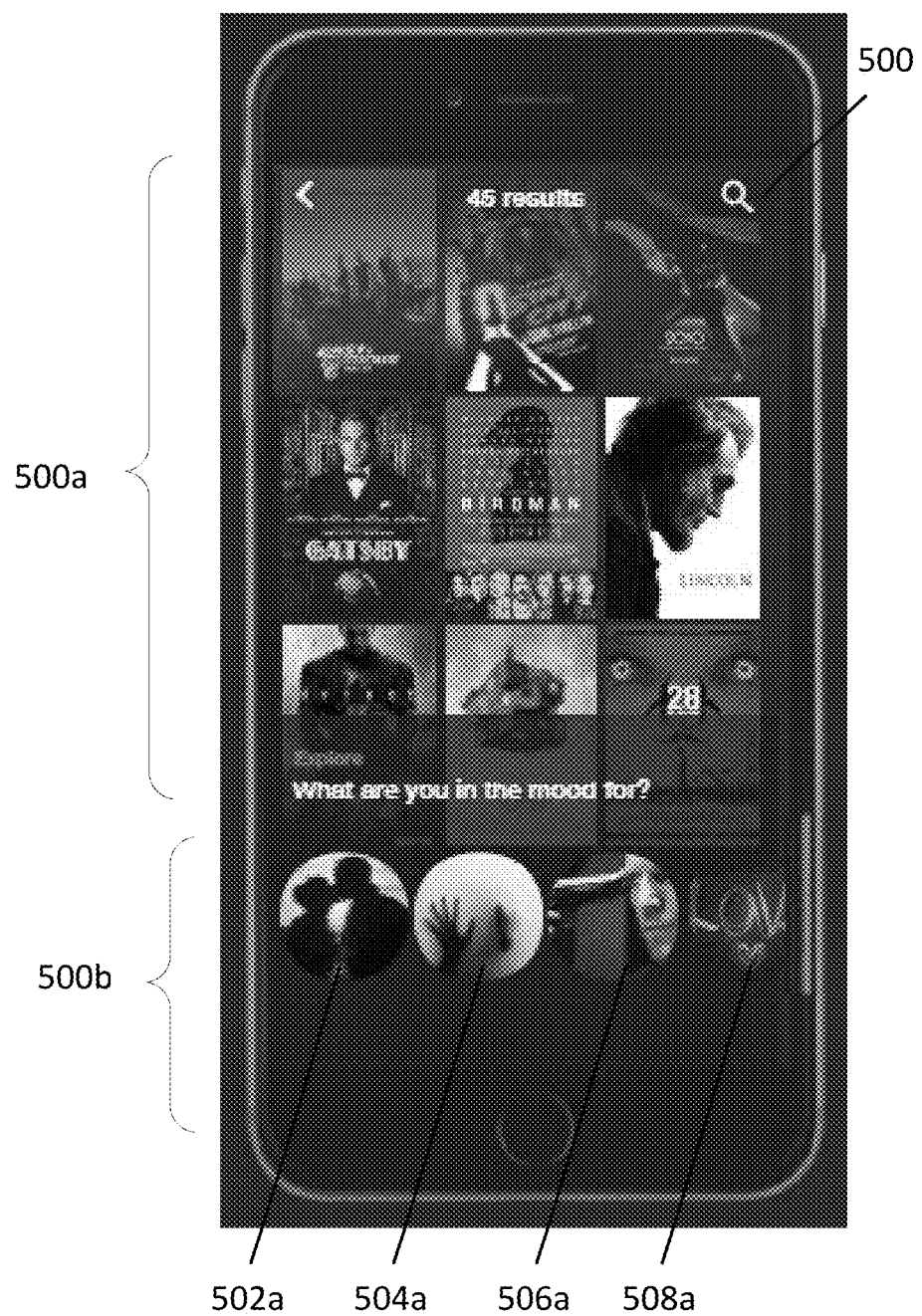

By way of a non-limiting example, in accordance with the example illustrated in FIG. 5B, within user interface (UI) 500, the user is presented with a listing of media items that correspond to particular states (i.e., emotions or states)—items 502a-508a. According to some embodiments, the display of the listed media items appears in a bottom portion (or pane) 500b of the UI 500, as illustrated in FIG. 5B. In this example, the listed media items each correspond to a specific state. For example, item 502a represents "romance"; item 504a represents "frightened"; item 506a represents "tension"; and item 508 represents "love." As discussed in more detail below, each displayed media item (items 502a-508a) displays a representation of the associated emotion/state. For example, item 502a which represents "romance" displays content of two people kissing. In another example, item 504a which represents "frightened" can display content from a known horror movie (for example, the shower scene in the movie "Psycho"). In yet another example, item 506a which represents "tension" can display content of a person holding a gun to his/her head; and, item 508a which represents "love" can display content of an animated scripting of the word "love".

Continuing with the example, the user can then select one or more of the displayed media items. For example, should the user select items 502a and 508a, a search will be performed for media content that corresponds to both "romance" and "love". Thus, the user can be presented with a media content listing of "romantic-comedy" movies—because romantic comedies have content related to both romance and love. In another example, the user selects item 506a related to "tension"; as a result, a search for media content is performed for content related to "tension" and the user is presented with a media content listing of action/adventure movies—which can include, for example, "Indiana Jones", "Star Wars", "Lord of the Rings" and the like.

An example of the search results discussed in the example illustrated in FIG. 5B—referred to as the media content listings or recommendation listing—is identified by item 510. The listing 510 can be displayed in portion 500a of UI 500. The listing can comprise, for example, icons or other visual representations for each identified media, as illustrated in portion 500a of FIG. 5B. For example, using the "tension" search as an example, an icon can be displayed for each identified movie, where the cover art for each movie can be displayed. In another example, item 510 may comprise a listing of the title of each recommended movie, where the title is a click-able icon that enables the user the view additional information about the movie and/or view the movie via a deep-linking feature associated with the displayed video information.

According to some embodiments, as discussed in more detail below with respect to FIG. 4, the systems and methods discussed herein can be performed again (i.e., recursively) upon a display of the recommendation listing (item 510). For example, utilizing FIG. 5B again, upon displaying the "tension" movies: "Indiana Jones", "Star Wars", "Lord of the Rings" and the like, as discussed above in portion 500a of UI 500, the user can then be presented with a refined set of media items. That is, the previous media items 502a-508a can be replaced or updated with new content associated with sub-states (i.e., emotions that fall under the larger umbrella of emotions previously listed).

For example, the user above selected "tension". Thus, items 502a-508a can now display sub-states from a "tension" hierarchy. For example, upon displaying listing 510, item 502a may now display content related to "action", item 504a may now display content related to "rise-and-fall", item 506a may now display content related to "angriness", and item 508a may now display content related to "nostalgia". The "action", "rise-and-fall", "angriness" and "nostalgia" are all non-limiting examples of sub-states of the "tension" state. Therefore, upon the user selecting another item from portion 500b after listing 510 is displayed, another search can be performed which further refines the "tension" state-category based on the associated state of the selected media item 502a-508a.

The displayed state media items (referred to as items 502a-508a in FIG. 5B) represent a user emotion and can take the form of a content item including, but not limited to, an image, video, looping video (e.g., graphics interchange format (GIF) file), text, audio, and/or any other type of known or to be known multi-media format. Thus, the disclosed systems and methods can be implemented via displayed media items (items 502a-508a, or the items listed in listing 510) of any type, including, but not limited to, video, audio, images, text, and/or any other type of multi-media content. While the discussion herein will focus on video content items, it should not be construed as limiting, as any type of content or multimedia content, whether known or to be known, can be utilized without departing from the scope of the instant disclosure. Thus, in another example, a displayed state media item (e.g., item 502a) can display "happiness" via a video content item showing a person laughing—for example, a GIF of a user laughing.

As discussed in more detail below at least in relation to FIG. 6, according to some embodiments, information associated with or derived from recommended media, selected and/or rendered media, as discussed herein, can be used for monetization purposes and targeted advertising when providing, delivering or enabling access to the recommended/selected media. Providing targeted advertising to users associated with such discovered content can lead to an increased click-through rate (CTR) of such ads and/or an increase in the advertiser's return on investment (ROI) for serving such content provided by third parties (e.g., digital advertisement content provided by an advertiser, where the advertiser can be a third party advertiser, or an entity directly associated with or hosting the systems and methods discussed herein).

Certain embodiments will now be described in greater detail with reference to the figures. In general, with reference to FIG. 1, a system 100 in accordance with an embodiment of the present disclosure is shown. FIG. 1 shows components of a general environment in which the systems and methods discussed herein may be practiced. Not all the components may be required to practice the disclosure, and variations in the arrangement and type of the components may be made without departing from the spirit or scope of the disclosure. As shown, system 100 of FIG. 1 includes local area networks ("LANs")/wide area networks ("WANs")—network 105, wireless network 110, mobile devices (client devices) 102-104 and client device 101. FIG. 1 additionally includes a variety of servers, such as content server 106, application (or "App") server 108, search server 120 and advertising ("ad") server 130.

One embodiment of mobile devices 102-104 is described in more detail below. Generally, however, mobile devices 102-104 may include virtually any portable computing device capable of receiving and sending a message over a network, such as network 105, wireless network 110, or the like. Mobile devices 102-104 may also be described generally as client devices that are configured to be portable. Thus, mobile devices 102-104 may include virtually any portable computing device capable of connecting to another computing device and receiving information. Such devices include multi-touch and portable devices such as, cellular telephones, smart phones, display pagers, radio frequency (RF) devices, infrared (IR) devices, Personal Digital Assistants (PDAs), handheld computers, laptop computers, wearable computers, smart watch, tablet computers, phablets, integrated devices combining one or more of the preceding devices, and the like. As such, mobile devices 102-104 typically range widely in terms of capabilities and features. For example, a cell phone may have a numeric keypad and a few lines of monochrome LCD display on which only text may be displayed. In another example, a web-enabled mobile device may have a touch sensitive screen, a stylus, and an HD display in which both text and graphics may be displayed.

A web-enabled mobile device may include a browser application that is configured to receive and to send web pages, web-based messages, and the like. The browser application may be configured to receive and display graphics, text, multimedia, and the like, employing virtually any web based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message.

Mobile devices 102-104 also may include at least one client application that is configured to receive content from another computing device. The client application may include a capability to provide and receive textual content, graphical content, audio content, and the like. The client application may further provide information that identifies itself, including a type, capability, name, and the like. In one embodiment, mobile devices 102-104 may uniquely identify themselves through any of a variety of mechanisms, including a phone number, Mobile Identification Number (MIN), an electronic serial number (ESN), or other mobile device identifier.

In some embodiments, mobile devices 102-104 may also communicate with non-mobile client devices, such as client device 101, or the like. In one embodiment, such communications may include sending and/or receiving messages, searching for, viewing and/or sharing photographs, audio clips, video clips, or any of a variety of other forms of communications. Client device 101 may include virtually any computing device capable of communicating over a network to send and receive information. The set of such devices may include devices that typically connect using a wired or wireless communications medium such as personal computers, multiprocessor systems, microprocessor-based or programmable consumer electronics, network PCs, or the like. Thus, client device 101 may also have differing capabilities for displaying navigable views of information.

Client devices 101-104 computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

Wireless network 110 is configured to couple mobile devices 102-104 and its components with network 105. Wireless network 110 may include any of a variety of wireless sub-networks that may further overlay stand-alone ad-hoc networks, and the like, to provide an infrastructure-oriented connection for mobile devices 102-104. Such sub-networks may include mesh networks, Wireless LAN (WLAN) networks, cellular networks, and the like.

Network 105 is configured to couple content server 106, application server 108, or the like, with other computing devices, including, client device 101, and through wireless network 110 to mobile devices 102-104. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another, and/or other computing devices.

Within the communications networks utilized or understood to be applicable to the present disclosure, such networks will employ various protocols that are used for communication over the network. Signal packets communicated via a network, such as a network of participating digital communication networks, may be compatible with or compliant with one or more protocols. Signaling formats or protocols employed may include, for example, TCP/IP, UDP, QUIC (Quick UDP Internet Connection), DECnet, NetBEUI, IPX, APPLETALK™, or the like. Versions of the Internet Protocol (IP) may include IPv4 or IPv6. The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

According to some embodiments, the present disclosure may also be utilized within or accessible to an electronic social networking site. A social network refers generally to an electronic network of individuals, such as acquaintances, friends, family, colleagues, or co-workers, that are coupled via a communications network or via a variety of sub-networks. Potentially, additional relationships may subsequently be formed as a result of social interaction via the communications network or sub-networks. In some embodiments, multi-modal communications may occur between members of the social network. Individuals within one or more social networks may interact or communication with other members of a social network via a variety of devices. Multi-modal communication technologies refers to a set of technologies that permit interoperable communication across multiple devices or platforms, such as cell phones, smart phones, tablet computing devices, phablets, personal computers, televisions, set-top boxes, SMS/MMS, email, instant messenger clients, forums, social networking sites, or the like.

In some embodiments, the disclosed networks 110 and/or 105 may comprise a content distribution network(s). A "content delivery network" or "content distribution network" (CDN) generally refers to a distributed content delivery system that comprises a collection of computers or computing devices linked by a network or networks. A CDN may employ software, systems, protocols or techniques to facilitate various services, such as storage, caching, communication of content, or streaming media or applications. A CDN may also enable an entity to operate or manage another's site infrastructure, in whole or in part.

The content server 106 may include a device that includes a configuration to provide content via a network to another device. A content server 106 may, for example, host a site or service, such as streaming media site/service (e.g., Netflix®), an email platform or social networking site, or a personal user site (such as a blog, vlog, online dating site, and the like). A content server 106 may also host a variety of other sites, including, but not limited to business sites, educational sites, dictionary sites, encyclopedia sites, wikis, financial sites, government sites, and the like. Devices that may operate as content server 106 include personal computers desktop computers, multiprocessor systems, microprocessor-based or programmable consumer electronics, network PCs, servers, and the like.

Content server 106 can further provide a variety of services that include, but are not limited to, streaming and/or downloading media services, search services, email services, photo services, web services, social networking services, news services, third-party services, audio services, video services, instant messaging (IM) services, SMS services, MMS services, FTP services, voice over IP (VOIP) services, or the like. Such services, for example a video application and/or video platform, can be provided via the application server 108, whereby a user is able to utilize such service upon the user being authenticated, verified or identified by the service. Examples of content may include images, text, audio, video, or the like, which may be processed in the form of physical signals, such as electrical signals, for example, or may be stored in memory, as physical states, for example.

An ad server 130 comprises a server that stores online advertisements for presentation to users. "Ad serving" refers to methods used to place online advertisements on websites, in applications, or other places where users are more likely to see them, such as during an online session or during computing platform use, for example. Various monetization techniques or models may be used in connection with sponsored advertising, including advertising associated with user. Such sponsored advertising includes monetization techniques including sponsored search advertising, non-sponsored search advertising, guaranteed and non-guaranteed delivery advertising, ad networks/exchanges, ad targeting, ad serving and ad analytics. Such systems can incorporate near instantaneous auctions of ad placement opportunities during web page creation, (in some cases in less than 500 milliseconds) with higher quality ad placement opportunities resulting in higher revenues per ad. That is advertisers will pay higher advertising rates when they believe their ads are being placed in or along with highly relevant content that is being presented to users. Reductions in the time needed to quantify a high quality ad placement offers ad platforms competitive advantages. Thus higher speeds and more relevant context detection improve these technological fields.

For example, a process of buying or selling online advertisements may involve a number of different entities, including advertisers, publishers, agencies, networks, or developers. To simplify this process, organization systems called "ad exchanges" may associate advertisers or publishers, such as via a platform to facilitate buying or selling of online advertisement inventory from multiple ad networks. "Ad networks" refers to aggregation of ad space supply from publishers, such as for provision en masse to advertisers. For web portals like Yahoo!®, advertisements may be displayed on web pages or in apps resulting from a user-defined search based at least in part upon one or more search terms. Advertising may be beneficial to users, advertisers or web portals if displayed advertisements are relevant to interests of one or more users. Thus, a variety of techniques have been developed to infer user interest, user intent or to subsequently target relevant advertising to users. One approach to presenting targeted advertisements includes employing demographic characteristics (e.g., age, income, sex, occupation, etc.) for predicting user behavior, such as by group. Advertisements may be presented to users in a targeted audience based at least in part upon predicted user behavior(s).

Another approach includes profile-type ad targeting. In this approach, user profiles specific to a user may be generated to model user behavior, for example, by tracking a user's path through a web site or network of sites, and compiling a profile based at least in part on pages or advertisements ultimately delivered. A correlation may be identified, such as for user purchases, for example. An identified correlation may be used to target potential purchasers by targeting content or advertisements to particular users. During presentation of advertisements, a presentation system may collect descriptive content about types of advertisements presented to users. A broad range of descriptive content may be gathered, including content specific to an advertising presentation system. Advertising analytics gathered may be transmitted to locations remote to an advertising presentation system for storage or for further evaluation. Where advertising analytics transmittal is not immediately available, gathered advertising analytics may be stored by an advertising presentation system until transmittal of those advertising analytics becomes available.

Servers 106, 108, 120 and 130 may be capable of sending or receiving signals, such as via a wired or wireless network, or may be capable of processing or storing signals, such as in memory as physical memory states. Devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally, a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

In some embodiments, users are able to access services provided by servers 106, 108, 120 and/or 130. This may include in a non-limiting example, authentication servers, search servers, email servers, social networking services servers, SMS servers, IM servers, MMS servers, exchange servers, photo-sharing services servers, and travel services servers, via the network 105 using their various devices 101-104. In some embodiments, applications, such as a streaming video application (e.g., Netflix®, Hulu®, iTunes®, Amazon Prime®, HBO Go®, and the like), blog, photo storage/sharing application or social networking application (e.g., Flickr®, Tumblr®, and the like), can be hosted by the application server 108 (or content server 106, search server 120 and the like). Thus, the application server 108 can store various types of applications and application related information including application data and user profile information (e.g., identifying and behavioral information associated with a user). It should also be understood that content server 106 can also store various types of data related to the content and services provided by content server 106 in an associated content database 107, as discussed in more detail below. Embodiments exist where the network 105 is also coupled with/connected to a Trusted Search Server (TSS) which can be utilized to render content in accordance with the embodiments discussed herein. Embodiments exist where the TSS functionality can be embodied within servers 106, 108, 120 and/or 130.

Moreover, although FIG. 1 illustrates servers 106, 108, 120 and 130 as single computing devices, respectively, the disclosure is not so limited. For example, one or more functions of servers 106, 108, 120 and/or 130 may be distributed across one or more distinct computing devices. Moreover, in one embodiment, servers 106, 108, 120 and/or 130 may be integrated into a single computing device, without departing from the scope of the present disclosure.

FIG. 2 is a schematic diagram illustrating a client device showing an example embodiment of a client device that may be used within the present disclosure. Client device 200 may include many more or less components than those shown in FIG. 2. However, the components shown are sufficient to disclose an illustrative embodiment for implementing the present disclosure. Client device 200 may represent, for example, client devices discussed above in relation to FIG. 1.

As shown in the figure, Client device 200 includes a processing unit (CPU) 222 in communication with a mass memory 230 via a bus 224. Client device 200 also includes a power supply 226, one or more network interfaces 250, an audio interface 252, a display 254, a keypad 256, an illuminator 258, an input/output interface 260, a haptic interface 262, an optional global positioning systems (GPS) receiver 264 and a camera(s) or other optical, thermal or electromagnetic sensors 266. Device 200 can include one camera/sensor 266, or a plurality of cameras/sensors 266, as understood by those of skill in the art. The positioning of the camera(s)/sensor(s) 266 on device 200 can change per device 200 model, per device 200 capabilities, and the like, or some combination thereof Power supply 226 provides power to Client device 200. A rechargeable or non-rechargeable battery may be used to provide power. The power may also be provided by an external power source, such as an AC adapter or a powered docking cradle that supplements and/or recharges a battery.

Client device 200 may optionally communicate with a base station (not shown), or directly with another computing device. Network interface 250 includes circuitry for coupling Client device 200 to one or more networks, and is constructed for use with one or more communication protocols and technologies as discussed above. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Client device 200 also comprises input/output interface 260 for communicating with external devices, such as a headset, or other input or output devices not shown in FIG. 2. Input/output interface 260 can utilize one or more communication technologies, such as USB, infrared, Bluetooth™, or the like. Haptic interface 262 is arranged to provide tactile feedback to a user of the client device. For example, the haptic interface may be employed to vibrate client device 200 in a particular way when the Client device 200 receives a communication from another user.

Optional GPS transceiver 264 can determine the physical coordinates of Client device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of Client device 200 on the surface of the Earth. It is understood that under different conditions, GPS transceiver 264 can determine a physical location within millimeters for Client device 200; and in other cases, the determined physical location may be less precise, such as within a meter or significantly greater distances. In one embodiment, however, Client device may through other components, provide other information that may be employed to determine a physical location of the device, including for example, a MAC address, Internet Protocol (IP) address, or the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of Client device 200. The mass memory also stores an operating system 241 for controlling the operation of Client device 200. It will be appreciated that this component may include a general purpose operating system such as a version of UNIX, or LINUX™, or a specialized client communication operating system such as Windows Client™, or the Symbian® operating system. The operating system may include, or interface with a Java virtual machine module that enables control of hardware components and/or operating system operations via Java application programs.

Memory 230 further includes one or more data stores, which can be utilized by Client device 200 to store, among other things, applications 242 and/or other data. For example, data stores may be employed to store information that describes various capabilities of Client device 200. The information may then be provided to another device based on any of a variety of events, including being sent as part of a header during a communication, sent upon request, or the like. At least a portion of the capability information may also be stored on a disk drive or other storage medium (not shown) within Client device 300.

Applications 242 may include computer executable instructions which, when executed by Client device 200, transmit, receive, and/or otherwise process audio, video, images, and enable telecommunication with a server and/or another user of another client device. Other examples of application programs or "apps" in some embodiments include browsers, calendars, contact managers, task managers, transcoders, photo management, database programs, word processing programs, security applications, spreadsheet programs, games, search programs, and so forth. Applications 242 may further include search client 245 that is configured to send, to receive, and/or to otherwise process a search query and/or search result using any known or to be known communication protocols. Although a single search client 245 is illustrated it should be clear that multiple search clients may be employed. For example, one search client may be configured to enter a search query message, where another search client manages search results, and yet another search client is configured to manage serving advertisements, IMs, emails, and other types of known messages, or the like.

Having described the components of the general architecture employed within the disclosed systems and methods, the components' general operation with respect to the disclosed systems and methods will now be described below.

FIG. 3 is a block diagram illustrating the components for performing the systems and methods discussed herein. FIG. 3 includes a recommendation engine 300, network 315 and database 320. The recommendation engine 300 can be a special purpose machine or processor and could be hosted by an application server, content server, social networking server, web server, search server, content provider, email service provider, ad server, user's computing device, and the like, or any combination thereof.

According to some embodiments, recommendation engine 300 can be embodied as a stand-alone application that executes on a user device. In some embodiments, the recommendation engine 300 can function as an application installed on the user's device, and in some embodiments, such application can be a web-based application accessed by the user device over a network. In some embodiments, the recommendation engine 300 can be installed as an augmenting script, program or application to another media application (e.g., Yahoo!® Video, Netflix®, Hulu®, and the like).

The database 320 can be any type of database or memory, and can be associated with a content server on a network (e.g., content server 106, search server 120 or application server 108 from FIG. 1) or a user's device (e.g., device 101-104 or device 200 from FIGS. 1-2). Database 320 comprises a dataset of data and metadata associated with local and/or network information related to users, services, applications, content (e.g., video) and the like. Such information can be stored and indexed in the database 320 independently and/or as a linked or associated dataset. As discussed above, it should be understood that the data (and metadata) in the database 320 can be any type of information and type, whether known or to be known, without departing from the scope of the present disclosure.

According to some embodiments, database 320 can store data for users, e.g., user data. According to some embodiments, the stored user data can include, but is not limited to, information associated with a user's profile, user interests, user behavioral information, user attributes, user preferences or settings, user demographic information, user location information, user biographic information, and the like, or some combination thereof. In some embodiments, the user data can also include, for purposes rendering and/or delivering videos, user device information, including, but not limited to, device identifying information, device capability information, voice/data carrier information, Internet Protocol (IP) address, applications installed or capable of being installed or executed on such device, and/or any, or some combination thereof. It should be understood that the data (and metadata) in the database 320 can be any type of information related to a user, content, a device, an application, a service provider, a content provider, whether known or to be known, without departing from the scope of the present disclosure.

According to some embodiments, database 320 can comprise information associated with video service providers, such as, but not limited to, media providers that stream, enable download or otherwise avail users to media content (e.g., HBO®, Netflix®, iTunes®, Yahoo!®, YouTube®, Amazon®, and the like). Database 320 can be a single database housing information associated with such providers, and in some embodiments, database 320 can be configured as a linked set of data stores that provides such information, as each datastore in the set is associated with and/or unique to a specific service provider.

Database 320 can comprise data and metadata associated with video content from an assortment of media providers. For example, the information can be related to, but not limited to, the title of the video, cast of the video, directors or other staff of the video, the content type of the video, a category associated with the video, genre of the video, and the like. Such information can be represented as an n-dimensional vector (or feature vector) for each video, where the information associated with the video corresponds to nodes on the vector. Additionally, the video information in database 320 for each video can comprise, but is not limited to, factors including, but not limited to, popularity of the video, quality of the video, recency, and the like. Such factors can be derived from information provided by the user, a service provider (i.e., Yahoo!®), by the content/service providers providing video content (e.g., Netflix®, Hulu®, YouTube®), or by other third party services (e.g., rottentomatoes.com, IMDB™, and the like), or some combination thereof. In some embodiments, such additional factors can also be translated as nodes on the n-dimensional vector for a respective video. As such, database 320 can store and index video information in database 320 as linked set of video data and metadata, where the data and metadata relationship can be stored as the n-dimensional vector discussed above. Such storage can be realized through any known or to be known vector or array storage, including but not limited to, a hash tree, queue, stack, VList, or any other type of known or to be known dynamic memory allocation technique or technology.

While the discussion herein will focus on vector analysis of video information, as discussed above, the video information can be analyzed, stored and indexed according to any known or to be known computational analysis technique or algorithm, such as, but not limited to, cluster analysis, data mining, Bayesian network analysis, Hidden Markov models, artificial neural network analysis, logical model and/or tree analysis, and the like.

For purposes of the present disclosure, as discussed above, videos (which are stored and located in database 320) as a whole are discussed within some embodiments; however, it should not be construed to limit the applications of the systems and methods discussed herein. That is, while reference is made throughout the instant disclosure to videos (e.g., video clips, movies, music videos, radio broadcasts, podcasts, TV shows, YouTube® videos, Instagram® videos, Vine™ videos, and/or any other type of streaming or downloadable media content), other forms of user generated content and associated information, including for example text, audio, multimedia, RSS feed information can be used without departing from the scope of the instant application, which can thereby be communicated and/or accessed and processed by the recommendation engine 300 according to the systems and methods discussed herein.

As discussed above, with reference to FIG. 1, the network 315 can be any type of network such as, but not limited to, a wireless network, a local area network (LAN), wide area network (WAN), the Internet, or a combination thereof. The network 315 facilitates connectivity of the recommendation engine 300, and the database of stored resources 320. Indeed, as illustrated in FIG. 3, the recommendation engine 300 and database 320 can be directly connected by any known or to be known method of connecting and/or enabling communication between such devices and resources.

The principal processor, server, or combination of devices that comprises hardware programmed in accordance with the special purpose functions herein is referred to for convenience as recommendation engine 300, and includes popularity module 302, state module 304, search module 306 and calibration module 308. It should be understood that the engine(s) and modules discussed herein are non-exhaustive, as additional or fewer engines and/or modules (or sub-modules) may be applicable to the embodiments of the systems and methods discussed. The operations, configurations and functionalities of each module, and their role within embodiments of the present disclosure will be discussed with reference to FIG. 4.

As discussed in more detail below, the information processed by the recommendation engine 300 can be supplied to the database 320 in order to ensure that the information housed in the database 320 is up-to-date as the disclosed systems and methods leverage real-time information, state, sentiment, and/or behavior associated with the user, as discussed in more detail below.

Turning to FIG. 4, Process 400 details steps performed in accordance with exemplary embodiments of the present disclosure for automatically recommending video content to a user based on the user's determined state (i.e., the user's current emotional state).

Process 400 begins with Step 402 where an initial set of video recommendations is displayed to a user. According to some embodiments, Step 402 is based on a user's request to view video recommendations. In some embodiments, such request can be based on a received selection from a user to "explore" a video library. In some embodiments, the request can occur periodically based on a predetermined period of time, whereby the results of Process 400 can be cached for later retrieval by the user. Such predetermined period of time can be set by the user, by the system, recommendation engine 300, a service or media provider, and the like, or some combination thereof.

The displayed initial set of video recommendations is based on a number of factors associated with video content that can include, but are not limited to, popularity, quality and/or recency of the video content, or user-specific preferences or prior ratings. Such factors can be identified from database 320, as discussed above. For example, the initial set of video recommendations can comprise a number of videos that have a popularity score satisfying a popularity threshold. For example, only videos that have at least a 75% positive rating on rottentomatos.com are displayed to a user. Step 402 is performed by the popularity module 302.

It should be understood, however, that while the example herein and the module 302 refer to "popularity", any factor can be utilized in combination or alternatively without departing from the scope of the instant application. For example, the displayed set of initial recommendations may include only those videos that have recently been added to the video library according to a temporal threshold—such as, for example, those videos added within the last week.

Upon display of the initial set of video recommendations, a selectable set of media items corresponding to a set of emotional states are displayed. Step 404, which is performed by the state module 304. These state media items display content in the form of static or animated icons or selectable areas on the user interface that represents specific emotional states, such as, but not limited to, happiness, sadness, adventure, rise-and-fall, love, romance, and the like. As discussed above, the displayed state media items can take the form of a content item including, but not limited to, an image, video, looping video (e.g., graphics interchange format (GIF) file), text, audio, and/or any other type of known or to be known multi-media format. In embodiments the images in the icons are selected portions of media items, such as audio or video from a movie or a movie trailer. As mentioned above, the discussion herein will reference the state media items comprising video content (e.g., looping video content such as a GIF); however it should not be construed as limiting, as any type of content or multimedia content, whether known or to be known, can be utilized without departing from the scope of the instant disclosure.

A non-limiting example of the displayed state media items can be seen in FIG. 5A, where a listing of four state media items is displayed: items 502-508 representing "happiness", "sadness", "adventure" and "romance", respectively. Thus, item 502 can display a video of a person laughing, item 504 can display a video of a person crying, item 506 can display a video of a person zip-lining, and item 508 can display a video of a person hugging another person. Another non-limiting example of displayed state media items is illustrated in FIG. 5B, as discussed above in relation to items 502*a*-508*a*.

In some embodiments, the listing of state media items can be scrollable. For example, utilizing the example in FIG. 5A, items 502-508 are initially displayed; however, upon receiving input from the user, the items can scroll either right or left revealing additional state media items that represent additional emotional states. The number of displayed and/or scrollable state media items can be based on settings set by a user, administrator, video provider, network, and the like, or some combination thereof. The scrolling can be responsive to any known or to be known user input, such as, but not limited to, a touch input or "swipe" on a touch screen interface, a single or double click, a "force" touch satisfying a force threshold, looking at the displayed at least one state media item, and the like.

In some embodiments, Steps 402-404 can be performed in a single step where the initial set of video recommendations and state media items are displayed in the same computational iteration; and in some embodiments, Steps 402-404 can be performed in reverse order.

In Step 406, a user makes a selection of at least one displayed state media item. Such selection can be based on any type of known or to be known user input, such as, but not limited to, a touch input on a touch screen interface, a single or double click, a "force" touch satisfying a force threshold, looking at the displayed at least one state media item, and the like. It should be understood by anyone of skill in the art that any known or to be known user input designating a selection of at least one interface element displayed on a UI (or scrolling through the state media items) can be utilized by the disclosed systems and methods without departing from the scope of the instant disclosure.

As a result of the selection in Step 406, Step 408 involves automatically performing a search of a video repository (e.g., database 320) for video information. The search can also be performed across multiple repositories operated by a single entity, or can be repositories operated by different entities, such as for example Hulu®, Netflix® and/or Amazon®. The search is based on the information associated with the selected at least one state media item. Step 408 is performed by the search module 306. Thus the search, formatted in a manner known in the art, is formed so as to search for media items having associated information that would identify the media item as responsive to a search for a "happy" or "sad" movie, for example.

For purposes of this disclosure, reference will be made to only one selected state media item; however, this should not be viewed as limiting as the disclosed systems and methods performed respective to Process 400 can be implemented utilizing a selection of multiple state media items (as discussed above in the non-limiting example respective to FIG. 5B).

Thus, Step 408 involves translating the information associated with the selected state media item(s) into an n-dimensional vector. That is, the selected state media item, for example, item 502 in FIG. 5A representing "happiness", comprises information associated with the emotion "happiness." Such information includes, but is not limited to, data and metadata that provides indications that the context of the video displayed in item 502 corresponds to a "happy" emotional state. In some embodiments, the data and metadata can be provided from third parties, including, but not limited to, content providers, content generators, artists, advertisers, and the like. Such data and metadata, while associated with a third party, can be stored in database 320. In some embodiments, the data and metadata comprises a granular representation, which can be weighted, of the information associated with an emotional/mood state. According to some embodiments, this data and metadata is translated into an n-dimensional vector, where the degrees of happiness and/or other related data corresponding to such emotional state are allocated as nodes on the vector.

The n-dimensional vector (also referred to as a feature vector) for the selected state media item (for example, item 502) is then utilized as a basis for searching the video repository—database 320. As discussed above, according to some embodiments, the videos stored in the repository are stored and indexed as n-dimensional vectors. As such, Step 408 involves searching the database 320 by performing a computerized comparison between the feature vector of the selected state media item and the n-dimensional vectors of the videos in database 320. Such comparison can be performed by any known or to be known vector space analysis and comparison technique, as those videos having n-dimensional vectors matching the feature vector of the selected state media item at or above a similarity threshold are identified as a result of Step 410.

It should be understood that while the discussion herein discusses vector analysis and comparison via n-dimensional vectors and/or feature vectors, any other known or to be known computational analysis and/or comparison technique or algorithm can be utilized without departing from the scope of the instant disclosure, such as, but not limited to, cluster analysis, data mining, Bayesian network analysis, Hidden Markov models, artificial neural network analysis, logical model and/or tree analysis, and the like.

Thus, as a result of Step 408, a recalibrated recommendation listing is displayed, which includes videos that were determined to correspond to the selected state media item(s). Step 410, which is performed by the calibration module 308. That is, according to some embodiments, the initial set of video recommendations displayed in Step 402 is replaced with the video information associated with videos having an emotional similarity to the selected state media item(s). The emotional similarity is based on the vector/computational searching and/or computation/comparison analysis discussed above and performed in Step 408 (e.g., those videos having feature vectors matching the feature vector of the selected state media item(s) at or above the similarity threshold).

In some embodiments, the display of the identified videos involves displaying those videos having the highest similarity to the selected emotion atop the listing and displaying the videos with less similarity in a decreasing order. In some embodiments, the identified videos from database 320 that correspond to the selected emotional state (from Steps 408-410) can be ranked and displayed in accordance with at least one of the popularity, quality and/or recency of each video—which can be performed by the popularity module 302 and/or calibration module 308.

In some embodiments, Process 400 can then be fed back to Step 404, where in line with the display of the recalibrated set of video recommendations (from Step 410), another set of state media items can be displayed. This involves identifying a sub-state of the selected state media item. For example, if the user selected an emotion "adventure" from the initially displayed state media item set (Step 404), then after display of the "adventure" movie listing (Step 410), the user can then be presented with sub-state media items under the broad "adventure" state, which can include, for example, "action", "mythology", "animation" and "historical". And, should Process recycle through Steps 404-410 again, where for example, the user clicks on the sub-state item "action", upon recalibrating the video listing to filter even further to "action" movies from within the scope of "adventure" movies, the user can again be presented with another listing of state media items, which can fall under the "action" umbrella, and can include, for example "professional sports", "action sports", "winter sports" "car chases", and the like.

This recursive process can continue until a user makes a selection from the recalibrated video recommendation set. Step 412, which includes a determination as to whether a user has made a selection of a recommended media item or a selection of a refined state media item. And, as a result of such selection, the recommendation engine 300 enables rendering of the video associated with the selected video item via an application capable of rendering the selected video. Step 414. Such rendering can be enabled via a deep-linking feature, where identification that a user desires to render a video can instruct the computing device to open an application installed on the user's device that natively renders the identified video.

By way of another non-limiting example, utilizing FIG. 5A again as the basis for the example, user Bob is presented with the scrollable listing of selectable state media items— item 502 displaying a looping video (i.e., GIF) of two people "high-fiving" which represents the emotion "happiness"; item 504 displaying a looping video of "rain against a windowpane" which can represent the emotion "sadness"; item 506 displaying a looping video of a person "skiing" which can represent the emotion "adventure; and item 508 displaying a video of "an animation of a heart being drawn" which can represent the emotion "love".

User Bob clicks on item 508 which is then utilized as a search for video content. As discussed above, the information associated with the "love" emotion is translated into an n-dimensional vector which is then compared against the n-dimensional vectors of the videos in database 320. The videos having vectors matching the "love" vector at or above a similarity threshold (or an emotional similarity) are identified and presented to the user. In some embodiments, the identified videos can be ranked according to similarity of emotion, popularity, quality and/or recency of publication, such that a hierarchy of emotion similarity, popularity, quality and/or recency is evident from the display of the identified videos.

As a result of the search, user Bob can be presented with a movie listing 510 identifying videos that correspond to the emotion "love". For example, Bob can be presented with movies including "When Harry Met Sally", "Silver Linings Playbook", "Sleepless in Seattle", "Titanic", "Ghost", "Casablanca" "Father of the Bride" and "The Notebook".

As discussed above, Bob can select one of these movies which can be played in an application installed on his device or in an application that is executable on his device (e.g., a web-based application). However, should Bob desire to "dig deeper", he can "refine his emotional state". That is, in addition to being presented with video recommendations associated with the emotion "love" (recalibrated recommendation listing 510 from Step 410), he is also presented with a refined (or recalibrated) set of state media items (in portion 500b of UI 500). Since Bob selected "love" as his initial emotion, the recalibrated state media items will reference sub-states to "love." For example, the media items 502-508 can now display looping videos representing sub-states (or sub-emotions) of "love", including for example the emotions of "weddings", "prom", "children" and "divorce", respectively. Therefore, if Bob selects, for example, the state item for "weddings" he will then be presented with a recalibrated video recommendation listing 510 that includes movies not only associated with the "love" emotion, but also those that are associated with "weddings." The video listing 510 can continually be subject to recalibration (or refinement) according to narrower emotions until Bob selects a video to view from a displayed recommendation listing 510.

According to some embodiments of the present disclosure, information associated with a user's detected state or input, customized recommendations, selections by a user, and the like, as discussed above in relation to Process 400, can be fed back to the recommendation engine 300 for modeling (or training) of the information stored in database 320 via iterative or recursive bootstrapping or aggregation functionality. This can improve the accuracy of the identification of media recommendations presented to a specific user and/or other users on a network. Embodiments of the present disclosure involve the recommendation engine 300 applying such recursive/bootstrapping functions utilizing any known or to be known open source and/or commercial software machine learning algorithm, technique or technology.

Figure 6:
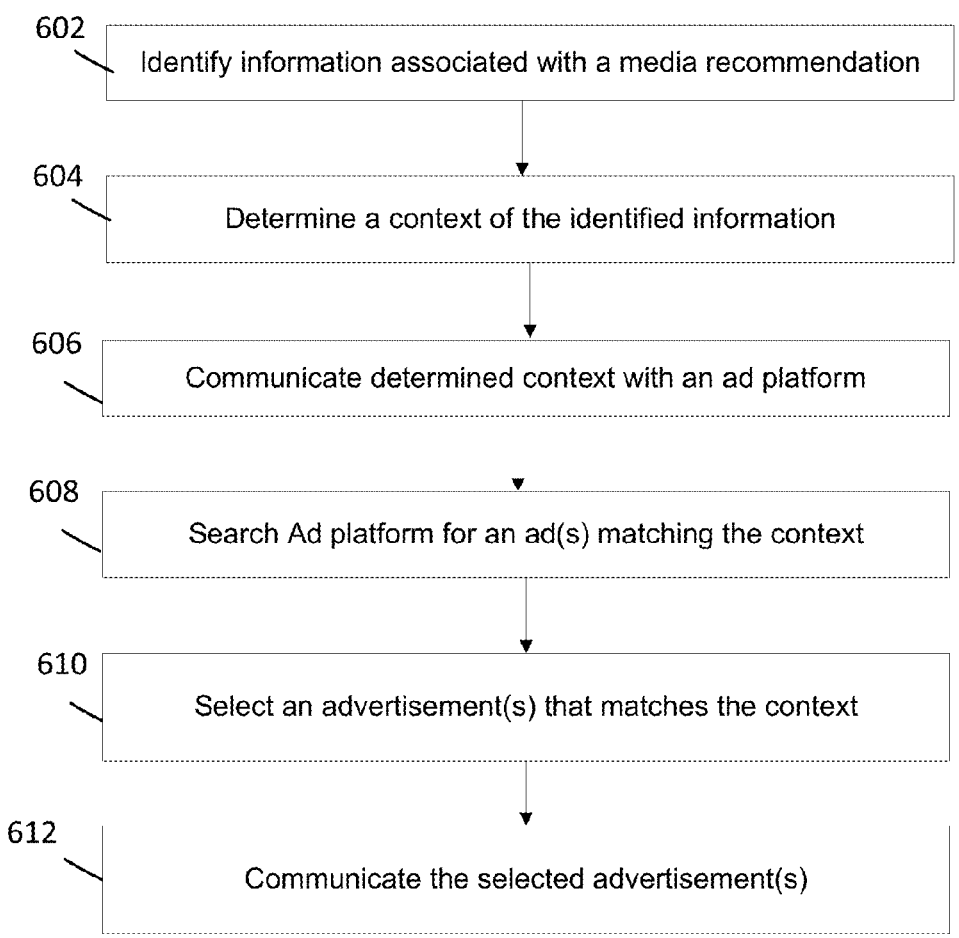
FIG. 6 is a flowchart illustrating steps performed in accordance with some embodiments of the present disclosure.

FIG. 6 is a work flow example 600 for serving relevant digital content associated with advertisements (e.g., advertisement content) based on the information associated with the media recommendation, as discussed above in relation to FIGS. 3-5B. Such information, referred to as "recommendation information" for reference purposes only, can include, but is not limited to, the state of a user, the identity, context and/or type of media content being rendered and/or recommended, the content of such media, and the like, and/or some combination thereof.

As discussed herein, reference to an "advertisement" should be understood to include, but not be limited to, digital content that provides information provided by another user, service, third party, entity, and the like. Such digital ad content can include any type of media renderable by a computing device, including, but not limited to, video, text, audio, images, and/or any other type of known or to be known multi-media. In some embodiments, the digital ad content can be formatted as hyperlinked multi-media content that provides deep-linking features and/or capabilities.

By way of a non-limiting example, work flow 600 includes a user being recommended media associated with the HBO® show "Game of Thrones". Based on such information, the user may be provided with digital ad content related to special benefits HBO® users can receive, such as a free promotional month of HBO® service. In another example, the user may be provided with coupons for purchasing the show's recent season on DVD and/or the books from an affiliate book store based on the determined content of the rendered video.

In Step 602, recommendation information associated with the media recommendation is identified. As discussed above, the recommendation information can be based on the recommendation process outlined above with respect to FIGS. 3-5B. For purposes of this disclosure, Process 600 will refer to single media recommendation as the basis for serving an advertisement(s); however, it should not be construed as limiting, as any number of recommendations, and/or quantities of information related to applications on a user device and/or media renderable via such applications can form such basis, without departing from the scope of the instant disclosure.

In Step 604, a context is determined based on the identified recommendation information. This context forms a basis for serving advertisements related to the recommendation information. In some embodiments, the context can be determined by determining a category which the recommendation information of Step 602 represents. For example, the category can be related to the determined state of a user, as discussed above, or can be related to the content type of the media being recommended, selected or rendered. In some embodiments, the identification of the context from Step 604 can occur before, during and/or after the analysis detailed above with respect to Process 400, or some combination thereof.

In Step 606, the context (e.g., content/context data) is communicated (or shared) with an advertisement platform comprising an advertisement server 130 and ad database. Upon receipt of the context, the advertisement server 130 performs a search for a relevant advertisement within the associated ad database. The search for an advertisement is based at least on the identified context.

In Step 608, the advertisement server 130 searches the ad database for an advertisement(s) that matches the identified context. In Step 610, an advertisement is selected (or retrieved) based on the results of Step 608. In some embodiments, the selected advertisement can be modified to conform to attributes of the page, message or method upon which the advertisement will be displayed, and/or to the application and/or device for which it will be displayed. In some embodiments, the selected advertisement is shared or communicated via the application the user is utilizing to render the media (e.g., HBO® from the above example). Step 612. In some embodiments, the selected advertisement is sent directly to each user's computing device. In some embodiments, the selected advertisement is displayed in conjunction with the rendered and/or recommended media on the user's device and/or within the application being used to recommend and/or render the media.

As shown in FIG. 7, internal architecture 700 of a computing device(s), computing system, computing platform and the like includes one or more processing units, processors, or processing cores, (also referred to herein as CPUs) 712, which interface with at least one computer bus 702. Also interfacing with computer bus 702 are computer-readable medium, or media, 706, network interface 714, memory 704, e.g., random access memory (RAM), run-time transient memory, read only memory (ROM), media disk drive interface 720 as an interface for a drive that can read and/or write to media including removable media such as floppy, CD-ROM, DVD, media, display interface 710 as interface for a monitor or other display device, keyboard interface 716 as interface for a keyboard, pointing device interface 718 as an interface for a mouse or other pointing device, and miscellaneous other interfaces not shown individually, such as parallel and serial port interfaces and a universal serial bus (USB) interface.

Memory 704 interfaces with computer bus 702 so as to provide information stored in memory 704 to CPU 712 during execution of software programs such as an operating system, application programs, device drivers, and software modules that comprise program code, and/or computer executable process steps, incorporating functionality described herein, e.g., one or more of process flows described herein. CPU 712 first loads computer executable process steps from storage, e.g., memory 704, computer readable storage medium/media 706, removable media drive, and/or other storage device. CPU 712 can then execute the stored process steps in order to execute the loaded computer-executable process steps. Stored data, e.g., data stored by a storage device, can be accessed by CPU 712 during the execution of computer-executable process steps.

Persistent storage, e.g., medium/media 706, can be used to store an operating system and one or more application programs. Persistent storage can also be used to store device drivers, such as one or more of a digital camera driver, monitor driver, printer driver, scanner driver, or other device drivers, web pages, content files, playlists and other files. Persistent storage can further include program modules and data files used to implement one or more embodiments of the present disclosure, e.g., listing selection module(s), targeting information collection module(s), and listing notification module(s), the functionality and use of which in the implementation of the present disclosure are discussed in detail herein.

Network link 728 typically provides information communication using transmission media through one or more networks to other devices that use or process the information. For example, network link 728 may provide a connection through local network 724 to a host computer 726 or to equipment operated by a Network or Internet Service Provider (ISP) 730. ISP equipment in turn provides data communication services through the public, worldwide packet-switching communication network of networks now commonly referred to as the Internet 732.

A computer called a server host 734 connected to the Internet 732 hosts a process that provides a service in response to information received over the Internet 732. For example, server host 734 hosts a process that provides information representing video data for presentation at display 710. It is contemplated that the components of system 700 can be deployed in various configurations within other computer systems, e.g., host and server.

At least some embodiments of the present disclosure are related to the use of computer system 700 for implementing some or all of the techniques described herein. According to one embodiment, those techniques are performed by computer system 700 in response to processing unit 712 executing one or more sequences of one or more processor instructions contained in memory 704. Such instructions, also called computer instructions, software and program code, may be read into memory 704 from another computer-readable medium 706 such as storage device or network link. Execution of the sequences of instructions contained in memory 704 causes processing unit 712 to perform one or more of the method steps described herein. In alternative embodiments, hardware, such as ASIC, may be used in place of or in combination with software. Thus, embodiments of the present disclosure are not limited to any specific combination of hardware and software, unless otherwise explicitly stated herein.

The signals transmitted over network link and other networks through communications interface, carry information to and from computer system 700. Computer system 700 can send and receive information, including program code, through the networks, among others, through network link and communications interface. In an example using the Internet, a server host transmits program code for a particular application, requested by a message sent from computer, through Internet, ISP equipment, local network and communications interface. The received code may be executed by processor 702 as it is received, or may be stored in memory 704 or in storage device or other non-volatile storage for later execution, or both.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

For the purposes of this disclosure the term "user", "subscriber" "consumer" or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method comprising the steps of:
displaying, on a display of a computing device within a second portion of a displayed user interface (UI), an initial set of videos;
displaying, on the display of the computing device within a first portion of the UI, a first set of state media items, each state media item visibly displaying content associated with a human mood;
receiving, at the computing device from a user, a selection of a state media item from said first state media item set;
analyzing, via the computing device, said selected state media item, and based on said analysis, identifying said mood content associated with said selected state media item;
generating, via the computing device, a feature vector for the selected state media item based on said analysis, said generation comprising translating said mood content into an n-dimensional vector such that data indicating said mood content of the selected state media item is represented as nodes on the feature vector;
communicating, via the computing device, a search request for media to a media repository, said search request comprising said feature vector as a search term for identifying media associated with the mood content within said media repository;
receiving, at the computing device, a search result comprising media information associated with the mood content; and
modifying, via the computing device, said second portion of the UI based on said received search result, said modification causing at least a portion of the initial set of videos to be modified to display videos related to said media information.

2. The method of claim 1, further comprising:
determining a set of sub-states of mood from the mood associated with the selected state media item; and
displaying, within the first portion of the UI, a second set of state media items, each second state media item visibly displaying content associated with a mood sub-state from the sub-state set.

3. The method of claim 2, further comprising:
receiving a second selection corresponding to a second state media item from the second set of state media items;
communicating a second search request for media to the media repository based on the selected second state media item, said search request comprises instructions for identifying media within the media repository related to the mood associated with the selected second state media item;
receiving a second search result comprising identified media information from the second search request;
compiling a second media item presentation based on the second search result; and
displaying said second media item presentation in the second portion of the UI.

4. The method of claim 1, wherein said media in the media repository is stored and indexed as n-dimensional vectors, wherein said identified media is based on a determination that the feature vector and n-dimensional vectors of the identified media match at or above a similarity threshold.

5. The method of claim 1, further comprising:
receiving a second selection from the user identifying media from said displayed media item presentation, said selection comprising instructions for said computing device to render selected media.

6. The method of claim 1, wherein said display of the first set of state media items comprises:
receiving a request for video recommendations, said request based on user input indicating the user's intent to view media recommendations; and
displaying said first set of state media items based on said request.

7. The method of claim 1, wherein said content visibly displayed within each state media item comprises looping video content associated with a respective human mood.

8. The method of claim 1, wherein said first set of state media items are determined based on information selected from a group consisting of: popularity, quality and recency.

9. The method of claim 1, wherein said first set of state media items further comprises additional state media items that are not initially displayed in the first portion of the UI.

10. The method of claim 9, further comprising:
receiving, from the user, input instructing the first set of state media items to scroll horizontally in order to reveal the additional state media items within the first portion of the UI.

11. The method of claim 1, wherein said steps are performed by an application installed and executing on the computing device, said execution of the application resulting in display of the UI.

12. A non-transitory computer-readable storage medium tangibly encoded with computer-executable instructions, that when executed by a processor associated with a computing device, performs a method comprising:
displaying, on a display of the computing device within a second portion of a displayed user interface (UI), an initial set of videos;
displaying, on the display of the computing device within a first portion of the UI, a first set of state media items, each state media item visibly displaying content associated with a human mood;
receiving, at the computing device from a user, a selection of a state media item from said first state media item set;
analyzing, via the computing device, said selected state media item, and based on said analysis, identifying said mood content associated with said selected state media item;
generating, via the computing device, a feature vector for the selected state media item based on said analysis, said generation comprising translating said mood content into an n-dimensional vector such that data indicating said mood content of the selected state media item is represented as nodes on the feature vector;
communicating, via the computing device, a search request for media to a media repository, said search request comprising said feature vector as a search term for identifying media associated with the mood content within said media repository;
receiving, at the computing device, a search result comprising media information associated with the mood content; and
modifying, via the computing device, said second portion of the UI based on said received search result, said modification causing at least a portion of the initial set of videos to be modified to display videos related to said media information.

13. The non-transitory computer-readable storage medium of claim 12, further comprising:
determining a set of sub-states of mood from the mood associated with the selected state media item; and
displaying, within the first portion of the UI, a second set of state media items, each second state media item visibly displaying content associated with a mood sub-state from the sub-state set.

14. The non-transitory computer-readable storage medium of claim 13, further comprising:
receiving a second selection corresponding to a second state media item from the second set of state media items;
communicating a second search request for media to the media repository based on the selected second state media item, said search request comprises instructions for identifying media within the media repository related to the mood associated with the selected second state media item;
receiving a second search result comprising identified media information from the second search request;
compiling a second media item presentation based on the second search result; and
displaying said second media item presentation in the second portion of the UI.

15. The non-transitory computer-readable storage medium of claim 12, wherein said media in the media repository is stored and indexed as n-dimensional vectors, wherein said identified media is based on a determination that the feature vector and n-dimensional vectors of the identified media match at or above a similarity threshold.

16. The non-transitory computer-readable storage medium of claim 12, further comprising:
receiving a second selection from the user identifying media from said displayed media item presentation, said selection comprising instructions for said computing device to render selected media.

17. The non-transitory computer-readable storage medium of claim 12, wherein said content visibly displayed within each state media item comprises looping video content associated with a respective human mood.

18. The non-transitory computer-readable storage medium of claim 12, wherein said first set of state media items further comprises additional state media items that are not initially displayed in the first portion of the UI, wherein the method further comprises receiving, from the user, input instructing the first set of state media items to scroll horizontally in order to reveal the additional state media items within the first portion of the UI.

19. A computing device comprising:
a processor;
a non-transitory computer-readable storage medium for tangibly storing thereon program logic for execution by the processor, the program logic comprising:
logic executed by the processor for displaying, on a display of the computing device within a second portion of a displayed user interface (UI), an initial set of videos;
logic executed by the processor for displaying, on the display of the computing device within a first portion of the UI, a first set of state media items, each state media item visibly displaying content associated with a human mood;
logic executed by the processor for receiving, at the computing device from a user, a selection of a state media item from said first state media item set;
logic executed by the processor for analyzing, via the computing device, said selected state media item, and based on said analysis, identifying said mood content associated with said selected state media item;
logic executed by the processor for generating, via the computing device, a feature vector for the selected state media item based on said analysis, said generation comprising translating said mood content into an n-dimensional vector such that data indicating said mood content of the selected state media item is represented as nodes on the feature vector;

logic executed by the processor for communicating, via the computing device, a search request for media to a media repository, said search request comprising said feature vector as a search term for identifying media associated with the mood content within said media repository;

logic executed by the processor for receiving, at the computing device, a search result comprising media information associated with the mood content; and logic executed by the processor for modifying, via the computing device, said second portion of the UI based on said received search result, said modification causing at least a portion of the initial set of videos to be modified to display videos related to said media information.

* * * * *